US006625321B1

(12) United States Patent
Li et al.

(10) Patent No.: US 6,625,321 B1
(45) Date of Patent: *Sep. 23, 2003

(54) EMBEDDED IMAGE CODER WITH RATE-DISTORTION OPTIMIZATION

(75) Inventors: Jin Li, Vancouver, WA (US); Shaw-Min Lei, Camas, WA (US)

(73) Assignee: Sharp Laboratories of America, Inc., Camas, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 724 days.

(21) Appl. No.: 09/016,571

(22) Filed: Jan. 30, 1998

Related U.S. Application Data

(60) Provisional application No. 60/035,126, filed on Feb. 3, 1997.

(51) Int. Cl.[7] .............................. G06K 9/36; G06K 9/46
(52) U.S. Cl. ........................................ 382/239; 382/247
(58) Field of Search .................................. 382/239, 232, 382/240, 247, 250, 251; 348/384–440.1; 341/106, 107, 51; 358/261.2, 430, 467

(56) References Cited

U.S. PATENT DOCUMENTS

| 4,811,398 A | | 3/1989 | Copperi et al. |
| 5,023,611 A | | 6/1991 | Chamzas et al. |
| 5,099,440 A | | 3/1992 | Pennebaker et al. |
| 5,315,670 A | | 5/1994 | Shapiro |
| 5,506,686 A | * | 4/1996 | Auyeung et al. ............ 382/238 |
| 5,691,770 A | * | 11/1997 | Keesman et al. ............ 348/405 |
| 5,694,171 A | * | 12/1997 | Katto ........................... 348/405 |
| 5,778,192 A | | 7/1998 | Schuster et al. |

OTHER PUBLICATIONS

Ramchandran et al., Rate–Distortion Optimal Fast Thresholding with Complete JPEG/MPEG Decoder Compatibility, Sep. 1994, p 700–704, IEEE Transactions on Image Processing, V 3, No. 5.*

(List continued on next page.)

Primary Examiner—Timothy M. Johnson
(74) Attorney, Agent, or Firm—Marger Johnson & McCollom

(57) ABSTRACT

A rate-distortion optimized embedding (RDE) coder optimizes rate-distortion performance by coding information bits in the order of their R-D slope. RDE allocates the available coding bits first to the information bit with the steepest R-D slope, which indicates the largest distortion decrease per coding bit. The resultant RDE bitstream can be truncated at any point and still maintain an optimal R-D performance. To avoid the overhead of coding order transmission, an expected R-D slope is calculated by both the encoder and the decoder from previous RDE coded bits. A probability estimation table from a QM arithmetic coder allows the R-D slope to be derived using a lookup table operation. The rate-distortion optimised embedding (RDE) coder significantly improves the coding efficiency over a wide range of bit rates.

27 Claims, 9 Drawing Sheets

OTHER PUBLICATIONS

Ramchandran et al., "Bit Allocation for Dependent Quantization with Applications to Multiresolution and MPEG Video Coders", IEEE Trans. on Image Proc., vol. 3, No. 5, Sep. 1994.*

"Embedded Image Coding Using Zerotree of Wavelet Coefficients", written by J. Shapiro, *IEEE Trans. On Signal Processing*, vol. 41, Dec. 1993, pp. 3445–3462.

"A Zero–Tree Entropy Coding Tool for Wavelet Compression of Video" written by S. Martucci and the VLBR Team, ISO/IEC JTC/SC29/WG11/N0441, Nov. 1995, 7 pages.

"A New, Fast and Efficient Image Codec Based on Set Partitioning in Hierarchical Trees" written by A. Said and W. Pearlman, *IEEE Trans. On Circuit and System for Video Technology*, vol. 6, No. 3, Jun. 1996. pp. 243–250.

"Multirate 3–D Subband Coding of Video" written by D. Taubman and A. Zakhor, *IEEE Trans. On Image Processing*, vol. 3, No. 5, Sep. 1994, pp. 572–588.

"Wavelet Packets–Based Image Coding Using Joint Space–Frequency Quantization" written by Z. Xiong and K. Ramchandran, First IEEE International Conference on Image Processing, Austin, Texas, Nov. 13–16, 1994, pp. 324–328.

"On the Improvements of Embedded Zerotree Wavelet (EZW) Coding" written by J. Li, P. Cheng and C.–C.J. Kuo, *SPIE: Visual Communication and Image Processing*, vol. 2601, Taipei, Taiwan, May 1995, pp. 1490–1501.

"Probability Estimation in Arithmetic and Adaptive Huffman Entropy Coders" written by D. Duttweiler and C. Chamzas, *IEEE Trans. On Image Processing*, vol. 4, No. 3, Mar. 1995, pp. 237–246.

*Bit Allocation for Dependent Quantization with Applications to Multiresolution and MPEG Video Coder*, K. Ramchandran, et al., IEEE Transactions on Image Processing, vol. 3, No. 5, Sep. 1994, pp. 533–545.

* cited by examiner

INITIATIVE OF
RATE-DISTORTION OPTIMIZATION

FIG.3a
(PRIOR ART)

|   | $b_1$ | $b_2$ | $b_3$ | $b_4$ | $b_5$ | $b_6$ | $b_7$ |       | SIGN |
|---|---|---|---|---|---|---|---|---|---|
| $w_0$ | 0 | 1 | 0 | 1 | 1 | 0 | 1 | ..... | + |
| $w_1$ | 1 | 0 | 0 | 1 | 0 | 1 | 0 | ..... | − |
| $w_2$ | 0 | 0 | 1 | 0 | 1 | 0 | 1 | ..... | + |
| $w_3$ | 0 | 0 | 0 | 1 | 1 | 1 | 0 | ..... | + |
| $w_4$ | 0 | 0 | 0 | 0 | 1 | 0 | 0 | ..... | − |
| $w_5$ | 0 | 0 | 1 | 0 | 0 | 1 | 0 | ..... | − |
| $w_6$ | 0 | 0 | 0 | 0 | 1 | 0 | 0 | ..... | + |
| $w_7$ | 0 | 0 | 0 | 0 | 0 | 0 | 1 | ..... | − |

FIRST ROW — 16
SECOND ROW — 18
THIRD ROW

FIG.3b
(PRIOR ART)

|   | $b_1$ | $b_2$ | $b_3$ | $b_4$ | $b_5$ | $b_6$ | $b_7$ |       | SIGN |
|---|---|---|---|---|---|---|---|---|---|
| $w_0$ | 0 | 1 | 0 | 1 | 1 | 0 | 1 | ..... | + |
| $w_1$ | 1 | 0 | 0 | 1 | 0 | 1 | 0 | ..... | − |
| $w_2$ | 0 | 0 | 1 | 0 | 1 | 0 | 1 | ..... | + |
| $w_3$ | 0 | 0 | 0 | 1 | 1 | 1 | 0 | ..... | + |
| $w_4$ | 0 | 0 | 0 | 0 | 1 | 0 | 0 | ..... | − |
| $w_5$ | 0 | 0 | 1 | 0 | 0 | 1 | 0 | ..... | − |
| $w_6$ | 0 | 0 | 0 | 0 | 1 | 0 | 0 | ..... | + |
| $w_7$ | 0 | 0 | 0 | 0 | 0 | 0 | 1 | ..... | − |

20 FIRST COLUMN
22 SECOND COLUMN
THIRD COLUMN

FIG. 3c

|   | $b_1$ | $b_2$ | $b_3$ | $b_4$ | $b_5$ | $b_6$ | $b_7$ | SIGN |
|---|---|---|---|---|---|---|---|---|
| $W_0$ | 0 | 1 | 0 | 1 | 1 | 0 | 1 | ..... | + |
| $W_1$ | 1 | 0 | 0 | 1 | 0 | 1 | 0 | ..... | − |
| $W_2$ | 0 | 0 | 1 | 0 | 1 | 0 | 1 | ..... | + |
| $W_3$ | 0 | 0 | 0 | 1 | 1 | 1 | 0 | ..... | + |
| $W_4$ | 0 | 0 | 0 | 0 | 1 | 0 | 0 | ..... | − |
| $W_5$ | 0 | 0 | 1 | 0 | 0 | 1 | 0 | ..... | − |
| $W_6$ | 0 | 0 | 0 | 0 | 1 | 0 | 0 | ..... | + |
| $W_7$ | 0 | 0 | 0 | 0 | 0 | 0 | 1 | ..... | − |

FIRST GROUP 24
26 SECOND GROUP
28 THIRD GROUP

FIG. 4

|   | $b_1$ | $b_2$ | $b_3$ | $b_4$ | $b_5$ | $b_6$ | $b_7$ | SIGN |
|---|---|---|---|---|---|---|---|---|
| $W_0$ | 0 | 1 | 0 | r | 1 | 0 | 1 | ..... | + |
| $W_1$ | 1 | 0 | 0 | r | 0 | 1 | 0 | ..... | − |
| $W_2$ | 0 | 0 | 1 | r | 1 | 0 | 1 | ..... | + |
| $W_3$ | 0 | 0 | 0 | s | 1 | 1 | 0 | ..... | + |
| $W_4$ | 0 | 0 | 0 | 0 | s | 0 | 0 | ..... | − |
| $W_5$ | 0 | 0 | 1 | r | 0 | 1 | 0 | ..... | − |
| $W_6$ | 0 | 0 | 0 | 0 | s | 0 | 0 | ..... | + |
| $W_7$ | 0 | 0 | 0 | s | 0 | 0 | 1 | ..... | − |

RATE-DISTORTION CURVE OF RDE, LZC AND SPIHT

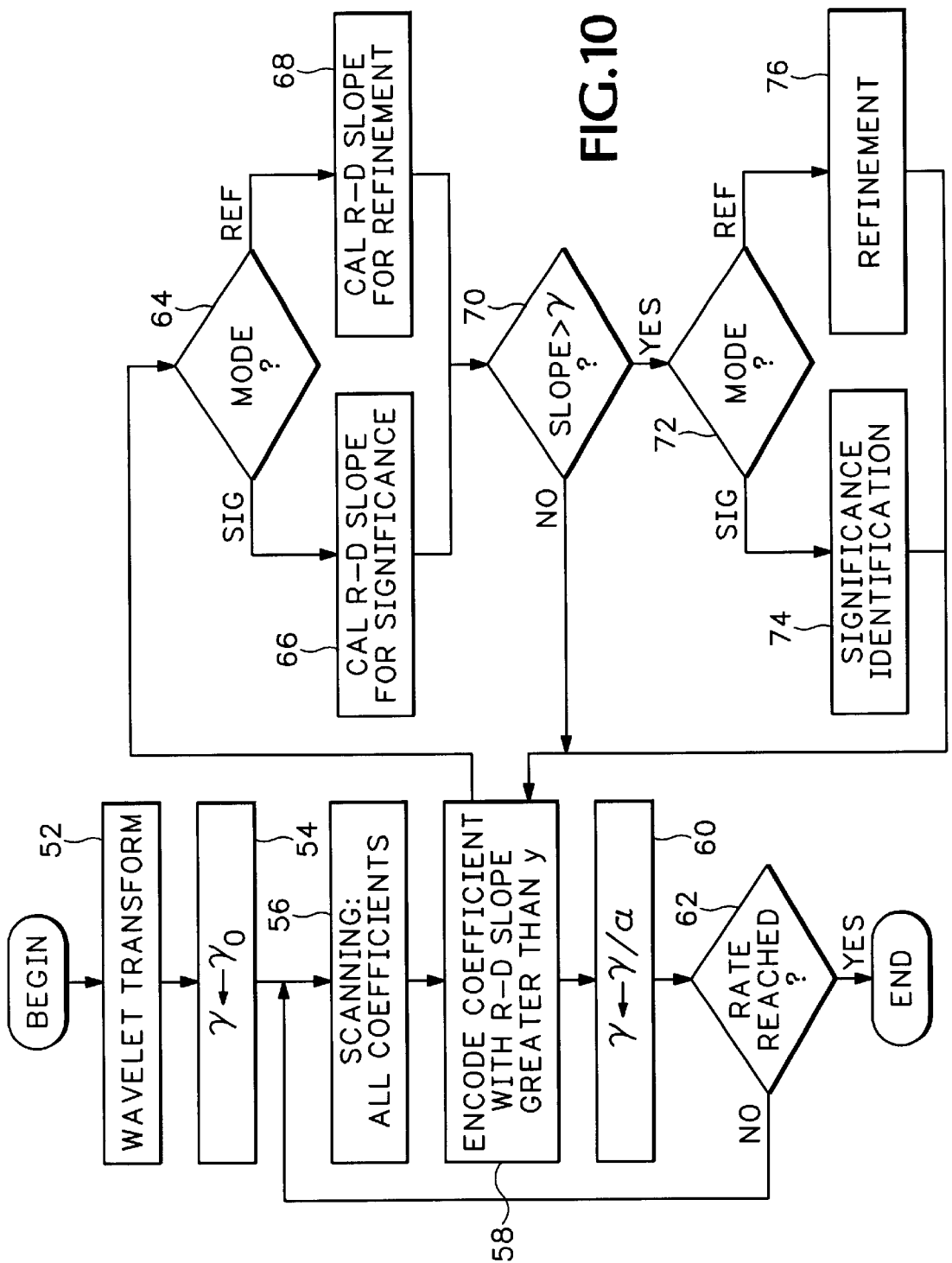

| ORDER | SYMBOL | VALUE | ORDER | SYMBOL | VALUE | ORDER | SYMBOL | VALUE |
|---|---|---|---|---|---|---|---|---|
| 1 | $b_1$ OF $w_0$ | 0 | 10 | $b_1$ OF $w_4$ | 0 | 19 | $b_2$ OF $w_5$ | 0 |
| 2 | $b_1$ OF $w_1$ | 1 | 11 | $b_1$ OF $w_5$ | 0 | 20 | $b_2$ OF $w_6$ | 0 |
| 3 | SIGN OF $w_1$ | − | 12 | $b_1$ OF $w_6$ | 0 | 21 | $b_2$ OF $w_7$ | 0 |
| 4 | $b_1$ OF $w_2$ | 0 | 13 | $b_1$ OF $w_7$ | 0 | | | |
| 5 | $b_1$ OF $w_3$ | 0 | 14 | $b_2$ OF $w_1$ | 0 | | | |
| 6 | $b_2$ OF $w_0$ | 1 | 15 | $b_3$ OF $w_2$ | 1 | | | |
| 7 | SIGN OF $w_0$ | + | 16 | SIGN OF $w_2$ | + | | | |
| 8 | $b_2$ OF $w_2$ | 0 | 17 | $b_3$ OF $w_3$ | 0 | | | |
| 9 | $b_2$ OF $w_3$ | 0 | 18 | $b_2$ OF $w_4$ | 0 | | | |

TABLE 1
FIG.12

| IMAGE | RATE (bpp) | LZC PSNR(dB) | SPIHT PSNR(dB) | RDE PSNR(dB) | GAIN VS LZC(dB) | GAIN VS SPIHT(dB) |
|---|---|---|---|---|---|---|
| LENA | 1 | 40.1 | 40.4 | 40.3 | 0.2 | -0.1 |
|  | 0.5 | 37.1 | 37.2 | 37.2 | 0.1 | 0.0 |
|  | 0.25 | 34.1 | 34.1 | 34.2 | 0.1 | 0.1 |
|  | 0.125 | 31.1 | 31.1 | 31.3 | 0.2 | 0.2 |
| BARBARA | 1 | 37.5 | 37.6 | 38.1 | 0.6 | 0.5 |
|  | 0.5 | 32.6 | 32.3 | 33.1 | 0.5 | 0.8 |
|  | 0.25 | 28.6 | 28.2 | 29.1 | 0.5 | 0.9 |
|  | 0.125 | 25.3 | 25.1 | 26.1 | 0.8 | 1.0 |
| BOATS | 1 | 41.2 | 41.1 | 41.6 | 0.4 | 0.5 |
|  | 0.5 | 36.9 | 36.5 | 37.0 | 0.1 | 0.5 |
|  | 0.25 | 33.1 | 32.5 | 33.2 | 0.1 | 0.7 |
|  | 0.125 | 29.9 | 29.3 | 30.0 | 0.1 | 0.7 |
| GOLD | 1 | 37.5 | 37.6 | 37.7 | 0.2 | 0.1 |
|  | 0.5 | 34.0 | 34.1 | 34.3 | 0.3 | 0.2 |
|  | 0.25 | 31.4 | 31.3 | 31.6 | 0.2 | 0.3 |
|  | 0.125 | 29.3 | 29.0 | 29.5 | 0.2 | 0.5 |

TABLE 2
FIG.13

EMBEDDED IMAGE CODER WITH RATE-DISTORTION OPTIMIZATION

This application claims the benefit of provisional application 60/035,126 filed Feb. 3, 1997.

BACKGROUND OF THE INVENTION

This invention relates to embedded coding techniques and more particularly to an embedded image coder with improved rate-distortion.

Embedded image coding improves coding performance and also allows a bitstream to be truncated at any point and still decode a reasonably good image. Some representative embedded coding techniques include the embedded zerotree wavelet coding (EZW) discussed in J. Shapiro, "Embedded image coding using zerotree of wavelet coefficients", IEEE Trans. On Signal Processing, vol. 41, pp.3445–3462, December 1993, the set partitioning in hierarchical trees (SPIHT) discussed in A. Said, and W. Pearlman, "A new, fast and efficient image codec based on set partitioning in hierarchical trees", IEEE Trans. On Circuit and System for Video Technology, Vol. 6, No. 3, June 1996, pp. 243–250 and the layered zero coding (LZC) discussed in, D Taubman and A. Zakhor, "Multirate 3-D subband coding of video", IEEE Trans. On Image Processing, Vol. 3, No. 5, September 1994, pp.572–588.

The ability to adjust the compression ratio by simply truncating the coding bitstream makes embedding attractive for a number of applications such as progressive image transmission, internet browsing, scalable image and video databases, digital cameras, low delay image communications, etc. Taking internet image browsing as an example, embedded coding requires storage on a server of only one copy of a high quality image. Depending on user demand, channel bandwidth conditions, and browser monitor quality, selectable amounts of the image bit stream can be delivered to the browser. At an early stage of browsing, images can be retrieved with coarse quality so that a user can quickly go through a large number of images before choosing one image of interest. The chosen image can then be fully downloaded with a better quality level. During the download process, the image quality is gradually refined. The user can terminate the download process as soon as the quality is satisfactory to discern the image.

Embedded coding allows the bitstream to be arbitrarily truncated. However, existing embedded coding techniques are not optimized at every truncation point in the bit stream. Thus, if the encoded bitstream is truncated at random points in the bit stream, the image produced by the bit stream up to the point of truncation does not necessarily produce optimal image quality.

It is known that a fixed rate coder achieves optimality if the rate-distortion (R-D) slopes of all coded coefficients are the same, T. M. Cover and J. A. Thomas, "Elements of information theory", Chapter 13, John Wiley & Sons Inc, 1991. The criterion was used in rate control to adjust the quantization step size Q of each macroblocks, in which case the coding of video was optimal when the R-D slopes of all macroblocks were constant. See L.-J. Lin, A. Ortega and C.-C. J. Kuo, "Rate control using spline-interpolated R-D characteristics", SPIE: Visual Communication and Image Processing, vol. 2727, Orlando, Fla., April 1996, pp. 111–122 and K. Ramchandran, A. Ortega and M. Vetterli, "Bit allocation for dependent quantization with applications to multiresolution and MPEG video coders", IEEE Trans. On Image Processing, Vol. 3, No. 5, September 1994, pp. 533–545.

Xiong and Ramchandran use the constant rate-distortion slope criterion to derive the optimal quantization for wavelet packet coding. Z. Xiong and K. Ramchandran, "Wavelet packet-based image coding using joint space-frequency quantization", First IEEE International Conference on Image Processing, Austin, Tex., Nov. 13–16, 1994. However, Xiong and Ramchandran do not optimize rate-distortion optimization for embedded coders.

The R-D slopes of significance identification and refinement coding are different, and by placing the significance identification before the refinement coding, the coding efficiency can be improved. However, the improvement is limited since only the coding order of a few coefficients is effected. See Li, Cheng and Kuo J. Li, P. Cheng and C. -C. J. Kuo, "On the improvements of embedded zerotree wavelet (EZW) coding", SPIE: Visual Communication and Image Processing, vol. 2601, Taipei, Taiwan, May. 1995, pp. 1490–1501.

Thus, a need remains for an embedded coder that optimizes rate-distortion at many different truncation points in an encoded bit stream.

SUMMARY OF THE INVENTION

A rate-distortion optimised embedding (RDE) coder optimises rate-distortion performance by coding coefficients in order of their R-D slope. RDE allocates the available coding bits first to the coefficient with the steepest R-D slope, which indicates the largest distortion decrease per coding bit. The resultant RDE bitstream can be truncated at any point and still maintain an optimal R-D performance. To avoid the overhead of coding order transmission, an expected R-D slope is calculated by both the encoder and the decoder from previous RDE coded bits. A probability estimation table from a QM arithmetic coder allows the R-D slope to be derived using a lookup table operation. The RDE rate-distortion optimisation significantly improves the coding efficiency over a wide bit rate range.

The RDE embedded coding method digitizes the image and then transforms the image to form a set of coefficients each comprising multiple bits. The RDE coder repeatedly analyzes all the candidate bits before encoding individual bits. The candidate bits comprise one most significant unencoded bit from each coefficient. Individual rate-distortion values for the candidate bits represent a ratio of information content in the bit per cost in transmitting the bit. Selected bits are then encoded according to the associated distortion reduction values for the bits.

In one embodiment, one bit among the candidate bits having a maximum distortion reduction value is encoded. The candidate bits are updated comprising a next less significant bit in the encoded bit coefficient and the remaining unencoded candidate bits. The bit among the candidate bits with the highest distortion reduction value per coding bit is encoded next. The process is repeated until the RDE coder reaches a specified bit rate.

In another embodiment, a threshold value is set and the candidate bits having distortion reduction values greater than the threshold are encoded in each scan. The candidate bits are updated comprising a next less significant bit in the encoded bit coefficient and the remaining unencoded candidate bits. The threshold value is then reduced and a next set of unencoded candidate bits are processed. The candidate bits in the next set having distortion reduction values greater than the reduced threshold value are then encoded. The process is repeated until the RDE coder reaches the predetermined bit rate.

The foregoing and other objects, features and advantages of the invention will become more readily apparent from the following detailed description of a preferred embodiment of the invention, which proceeds with reference to the accompanying drawings.

BRIEF DESCRIPTION OF THE DRAWINGS

FIG. 3a is a table showing a coding order of a prior art conventional coder.

FIG. 3b is a table showing a coding order of a prior art embedded coder.

FIG. 3c is a table showing a coding order for a rate-distortion optimized embedded coder (RDE) according to the invention.

FIG. 4 is a table showing RDE estimation of the rate-distortion slopes based on previously encoded bits.

FIG. 10 is a flow chart showing how the RDE coder in FIG. 5 performs rate-distortion optimized embedded coding according to the invention.

FIG. 12 is table showing another example of a coding order for the RDE coder.

FIG. 13 is a table comparing rate-distortion for the different encoding techniques in FIG. 11.

DETAILED DESCRIPTION

Figure 1:
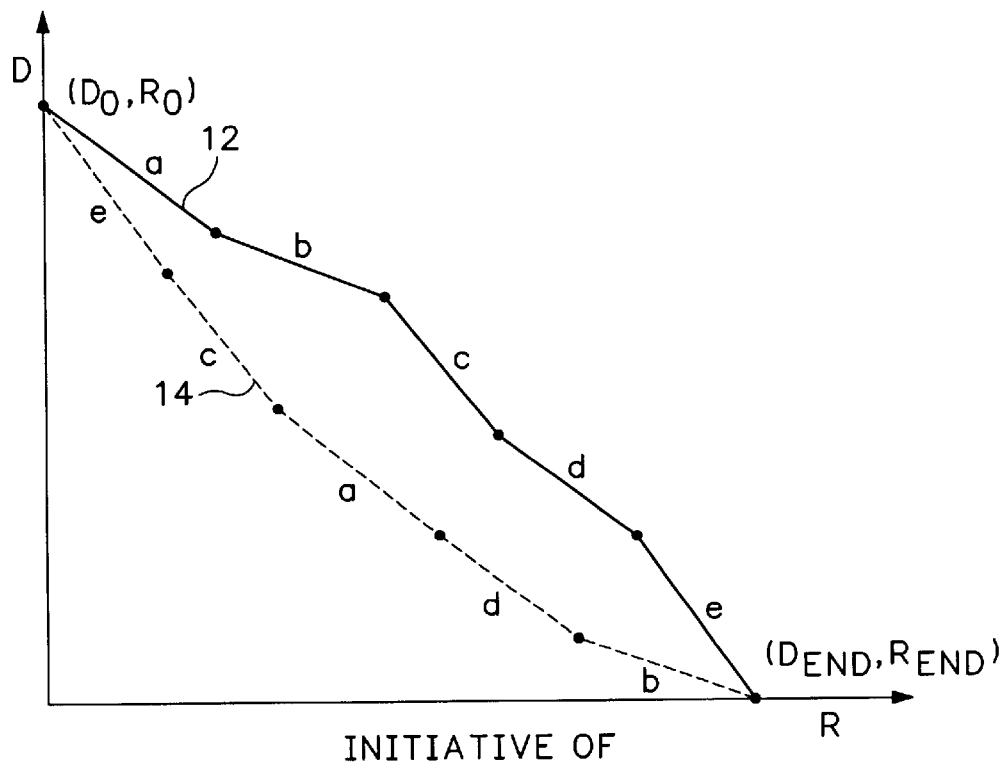
FIG. 1 is graph comparing a conventional encoded bit stream with an encoded bit with rate-distortion optimization according to the invention.

To achieve optimal rate-distortion performance at every truncation point in a bit stream, symbols are encoded in order of their steepest rate-distortion (R-D) slope. The result of the RDE encoder is illustrated in FIG. 1. There are five symbols a, b, c, d and e that are be coded independently. The coding of each symbol requires a certain amount of bits represented by horizontal rate axis R. Encoding bits result in a certain amount of distortion decrease represented by vertical distortion axis D. Conventional sequential coding in the order of symbol a to e gives the R-D curve shown as solid line 12. The R-D curve shown as dashed line 14 shows the effects when coding is reordered so that the symbol with the steepest R-D slope is encoded first. Though both performance curves reach the same final R-D point, the coder generating the dashed line 14 performs much better when the output bitstream is truncated at any intermediate bit rate.

The rate-distortion optimized coder (RDE) according to the invention, allocates the available coding bits first to the coefficient with the steepest R-D slope. The steepest R-D slope is defined as the coefficient bit that provides the largest distortion decrease in the image per coding bit. When all symbols have been coded, the coding is lossless and RDE may generate similar performance as non-RDE coding techniques. However, RDE optimization outperforms conventional embedded coding at intermediate bit rates. If the filter or transform used to encode image data is not integer based, RDE always outperforms convention embedding since lossless coding can not be achieved.

The two primary steps performed in RDE are R-D slope calculation and coefficient selection. To avoid sending the overhead of coding order, RDE can be based on an expected R-D slope that is calculated independently by both an encoder and a decoder. The expected R-D slope can be calculated using a lookup table operation in conjunction with a probability estimation table of a QM-coder. Operation of QM-coders are described in W. Pennebaker and J. Mitchell, IBM, "Probability adaptation for arithmetic coders", U.S. Pat. No. 5,099,440, Mar. 24, 1992; and D. Duttweiler and C. Chamzas, "Probability estimation in arithmetic and adaptive Huffman entropy coders", IEEE Trans. On Image Processing, vol. 4 no. 3, March 1995, pp. 237–246, which are both herein incorporated by reference.

Implementation of Rate-Distortion Optimized Embedding (RDE)

In the discussion below, it is assumed that an image has already been converted into the transform domain. Any transform can be used with the embedded coding technique including a wavelet decomposition or DCT transform. For simplicity, the RDE is described in terms of a wavelet decomposition. The index of a transform coefficient is denoted by i=(s,d,x,y), where s is a scale of the wavelet decomposition, d is a subband of decomposition which includes LL, LH, HL and HH, and x, y are spatial positions within the subband.

The first and second letter in d represent the filter applied in the vertical and horizontal direction, respectively. The letter L represents a low-pass filter, and H represents a high-pass filter. N denotes the total number of transform coefficients. The coefficient at index position i is denoted by $w_i$. Assume the coefficients have already been normalized through the division of the maximum absolute value of the transform coefficients $T_0$:

$$w'_i = \frac{w_i}{T_0} \quad \text{with} \quad T_0 = \max_i |w_i| \qquad (1)$$

To simplify the notation, the apostrophe in $w'_i$ is eliminated and the normalized transform coefficients are simply denoted as $w_i$. Because $w_i$ is between −1 and +1, it can be represented by a stream of binary bits as:

$$\pm 0.b_1 b_2 b_3 \ldots b_j \ldots \qquad (2)$$

where $b_j$ is the j-th most significant bit, or alternatively referred to as the j-th coding layer of coefficient $w_i$. For simplicity, the rate-distortion optimized embedding (RDE) discussion below, the coding symbol is defined as the smallest unit sent to the entropy coder and is either one single bit $b_j$ of the coefficient $w_i$ or the sign of $w_i$. However, the scope of the invention can easily extended to encoding arrangements, where the coding symbol may consist of encoding a group of bits from each coefficient at the same time, as in the case of the embedded zerotree wavelet coding (EZW) or the set partitioning in hierarchical trees (SPIHT).

Figure 2:
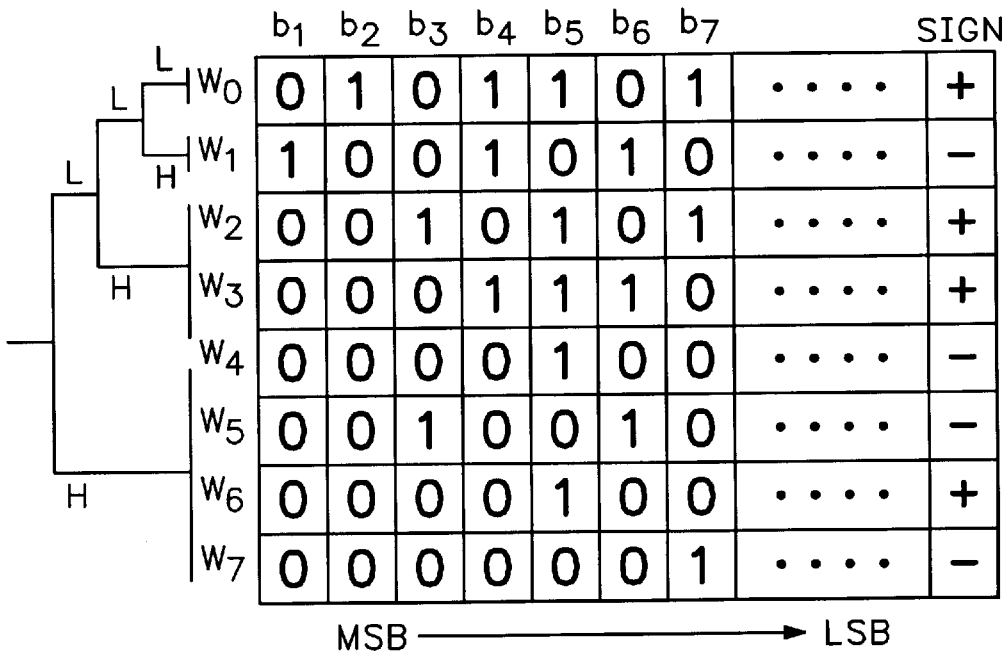
FIG. 2 is a table showing a bit array after transformation.

A sample bit array produced by a ID-wavelet transform is shown in FIG. 2. The i-th row of the bit array represents the transform coefficient $w_i$, and the j-th column of the bit array represents the bit plane $b_j$. The most significant bit is located at the left most column and the least significant bit is located at the right most column.

The encoding order of the bit-array is different for conventional, embedded, and rate-distortion optimized embedded coders. A conventional coder such as a JPEG coder or a MPEG coder first determines the quantization precision, or equivalently, the number of bits to encode each coefficient, then sequentially encodes one coefficient after another with certain entropy coding. Using the bit array of FIG. 2 as an example, the conventional coding is ordered row by row as further shown in FIG. 3a. A first row 16 is encoded, then a second row 18 is encoded and so on until the entire bit plane is encoded.

Embedded coding is different from the conventional coding shown in FIG. 3a because the image is coded bit-plane by bit-plane (column by column) as shown in FIG. 3b. The first bit of each coefficient in a first column 20 is encoded starting from the first bit in coefficient $w_0$ and ending with the first bit in coefficient $w_7$. The embedded coder then starts encoding a second column 22 of coefficients starting from the second bit of coefficient $w_0$ and ending with the second bit of coefficient $w_7$. The embedded bitstream can be truncated and still maintain some image quality since the most significant part of each coefficient is coded first. It is also suited for progressive image transmission because the quality of the decoded image gradually improves as more and more bits are received. On the other hand, the coding order of the embedded coding technique shown in FIG. 3b is not optimized for progressive image transmission.

RDE calculates the R-D slope $\lambda_i$ for each bit $b_j$ and encodes the bit with the largest R-D slope. The actual coding order of RDE depends on the calculated R-D slope and is image dependent. An example of the coding order of RDE is shown in FIG. 3c where a first group of bits 24 shown in cross-hatching comprising the first bits of coefficients $w_0$ through $w_4$ are encoded first and then a second group of bits 26 shown in opposite cross-hatching are encoded next. The order of encoding in the second group of bits 26 begins by encoding the second bit of coefficient $w_0$, then the second bit of coefficients $w_2$ and then coefficient $w_3$. Finally the first bits of coefficients $w_4$ through $w_7$ are encoded. The same process is conducted for the checkered bits in group 28 starting with the second bit of coefficient $w_1$ and ending with the second bit of coefficient $W_7$. The process is continued until a specified bit rate is reached or all coefficients are encoded. Another more elaborated coding order of RDE is shown in table 1 of FIG. 12. The order of coding, the symbol to encode and its value are listed in column 1, 2 and 3, respectively.

Expected Rate-Distortion Slope

If the optimization is based on the actual rate-distortion (R-D) slope, the decoder has to be informed of the order of coding. A large bit overhead is required to transmit the location of the symbol with the largest actual R-D slope and can easily nullify any advantages that can be brought up by rate-distortion optimization. To avoid transmitting the coding order, a prediction technique is used to calculate an estimated R-D slope in both the encoder and the decoder.

FIG. 4 shows how the rate-distortion slope is estimated based on the transmitted bits. The bits marked by horizontal hatching have already been coded. The bits marked with a checkered pattern are the next candidate bits for encoding. The letter S indicates the R-D slope for the bit will be estimated using a significance identification mode. The letter R indicates the R-D slope for the bit will be estimated using a refinement estimation mode.

Suppose at a certain coding instance, the most significant $(n_i-1)$ bits of coefficient $w_i$ have been encoded. The next set of candidate bits under consideration is the $n_i$-th bit of $w_i$, i=1, . . . , N. RDE calculates the expected R-D slope $\lambda_i$ for each candidate bit $b_{n_i}$, and encodes the one bit with the largest $\lambda_i$ value. The expected R-D slope $\lambda_i$ is based on the coding layer $n_i$, the significance status of coefficient $w_i$ (whether all of the previous $(n_i-1)$ bits of $w_i$ are zero), and the significance status of its surrounding coefficients.

RDE estimates the distortion decrease per coding bit if bit $b_{n_i}$ is coded. Since the information used to calculate the expected R-D slope can be derived independently by the decoder from the previously transmitted bits, the decoder can follow the coding order of the encoder without any overhead transmission. RDE encodes the symbol that gives the maximum expected distortion decrease per bit spent, thus achieving optimized R-D embedded coding performance as shown by the dashed line 14 in FIG. 1.

Figure 5:
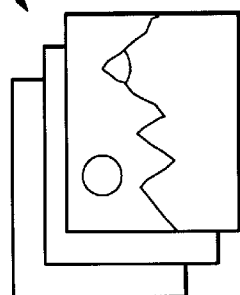
FIG. 5 is a block diagram of a RDE coder according to the invention.

An encoder 30 utilizing the RDE coder is shown in FIG. 5. Digitized images 31 are converted into coefficients by a transform 32. The RDE coder comprises a R-D slope calculator 34 that estimates the R-D slopes for the coefficient bits and a symbol selector 36 that selects bits for subsequent encoding according to the calculated R-D slope values. A quantizer 38 quantizes the RDE ordered bits and an arithmetic coder 40 further encodes the quantized bits. The output of quantizer 38 is inverse quantized and subtracted from the coefficient values output from transform 32.

Compared with traditional embedded coders, there are two key operations in RDE, R-D slope calculation and coefficient selection. Both operations have to be efficient so that the computational complexity of RDE remains low.

Calculation of the Rate-Distortion Slope

The coding technique described below allows the expected R-D slope to be derived using a lookup table operation. In RDE, the coding of candidate bits $b_{n_i}$ is encoded using either a significance identification mode or a refinement mode. If all previously coded bits in coefficient $w_i$ are 0s, $b_j=0$ for j=1 . . . $n_i-1$, the significance identification mode is used to encode bit $b_{n_i}$, otherwise, the refinement mode is used. For convenience, coefficient $w_i$ is called insignificant if all its previously coded bits are 0s. The insignificant coefficient is reconstructed with value 0 at the decoder side. When the first nonzero bit b is encountered, coefficient $w_i$ becomes significant. The sign for the coefficient needs to be encoded to distinguish the coefficient value between positive and negative, and it becomes non-zero at the decoder. From that point on, the refinement mode is used to encode the remaining bits of coefficient $w_i$.

Figure 6:
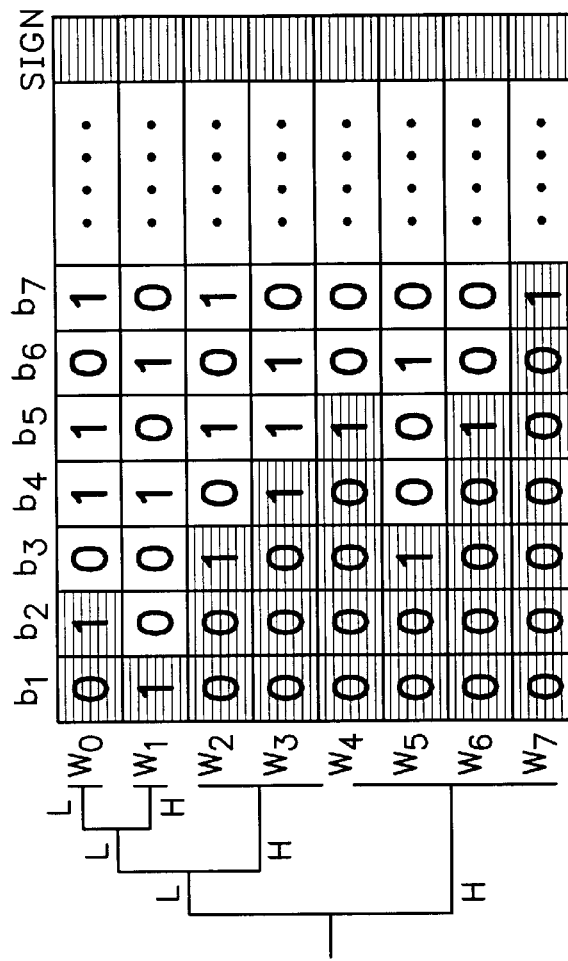
FIG. 6 is a table showing significance identification bits, refinement bits and sign bits.

Referring to FIG. 6, bits encoded during the significant identification mode are marked with horizontal hatching and bits encoded during the refinement mode are marked with dots. The bits marked by checkerboard patterns are sign bits, which are encoded when a coefficient just becomes significant. The expected R-D slopes and coding methods for significance identification and refinement are different.

Figure 7:
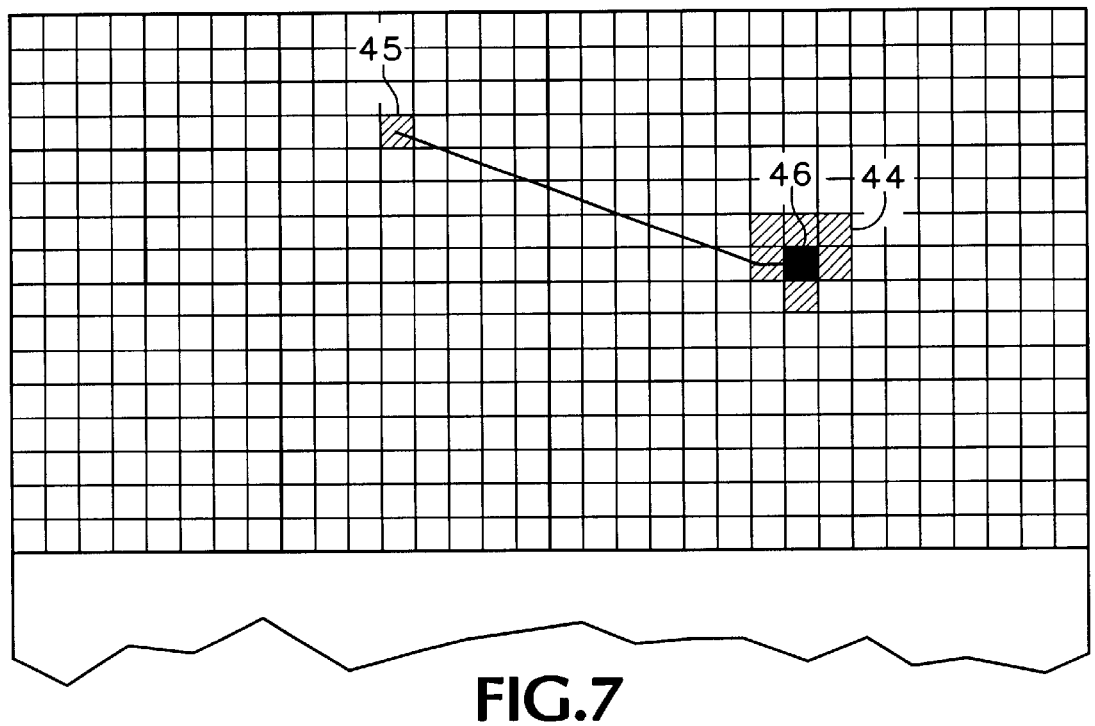
FIG. 7 shows an image context for a prior art QM-coder.

In significance identification, the coded bit is highly biased toward '0', i.e., non-significance. The result of significance identification is encoded with a QM-coder, which estimates the probability of significance of coefficient $w_i$ (denoted as $p_i$) with a state machine, and then arithmetic encodes it. As shown in FIG. 7, for bit 46 a context of 7 bits is used, which consists of 6 bits 44 shown in light shading representing the significant status for 6 spatial neighbor coefficients and 1 bit 45 representing the significant status of the coefficient which corresponds to the same spatial position but one scale up (i.e., in the lower resolution band of) the current coefficient $w_i$. By monitoring the pattern of past 0s ('insignificance') and 1s ('significance') under the same context (i.e., the same neighborhood configuration), the QM-coder estimates the probability of significance $p_i$ of the current symbol being analyzed. To explain further, if there were $n_0$ 0 symbols and $n_1$ 1 symbols in the past coding with the same context, the probability p that the current symbol appears 1 can be calculated by Bayesian estimation as:

$$p = \frac{n_1 + \delta}{n_0 + \delta + n_1 + \delta} \quad (3)$$

where $\delta$ is a parameter between [0,1] which relates to the a priori probability of the coded symbol. The probability p is associated with a state. Depending on whether the coded symbol is 1 or 0, it increases or decreases the probability p and thus transfers the coder to another state. By merging of the state of similar probabilities and balancing between the accuracy of probability estimation and quick response to the change in source characteristics, a QM-coder state table can be designed.

The QM-coder and its probability estimation, are described in W. Pennebaker and J. Mitchell, IBM, "Probability adaptation for arithmetic coders", U.S. Pat. No. 5,099,440, Mar. 24, 1992; D. Duttweiler and C. Chamzas, "Probability estimation in arithmetic and adaptive Huffman entropy coders", IEEE Trans. On Image Processing, vol. 4 no. 3, March 1995, pp. 237–246; and W. B. Pennebaker and J. L. Mitchell, "JPEG still image data compression standard", New York: Van Nostrand Reinhold, 1993.

In general, the probability estimation is a table transition operation. The estimated probability of significance $p_i$ is used not only for arithmetic coding, but also for the calculation of the R-D slope $\lambda_i$. On the other hand, the refinement and sign bits are equilibrium between '0' and '1'. An arithmetic coder encodes them with fixed probability 0.5.

RDE calculates the expected R-D slope $\lambda_i$ for all the candidate bits $b_{n_i}$, which is the average distortion decrease divided by the average coding rate increase:

$$\lambda_i = \frac{E[\Delta D_i]}{E[\Delta R_i]} \quad (4)$$

The expected R-D slope can not be calculated by averaging the distortion decrease per coding rate:

$$\lambda_i \neq E\left[\frac{\Delta D_i}{\Delta R_i}\right] \quad (5)$$

It is just like the calculation of the average speed of a vehicle traveling through different segments with varying speed. Its average speed is equal to the total travel distance divided by the total travel time, not the average of speed of different segments.

Figure 8:
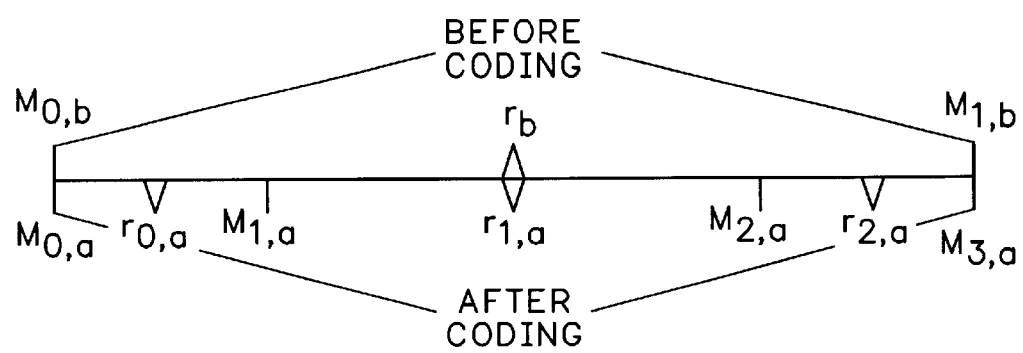
FIG. 8 is a graph illustrating coding interval subdivisions used for predicting rate-distortion slopes in the RDE coder.

Referring to FIG. 8, suppose before coding bit $b_{n_i}$, coefficient $w_i$ is known to be within interval $(M_{0,b}, M_{1,b})$ with decoding reconstruction $r_b$. Coding of bit $b_{n_i}$ supplies additional information of coefficient $w_i$ and restricts it into one of K subintervals $(M_{k,a}, M_{k+1,a})$ with decoding reconstruction $r_{k,a}$, $k=0, \ldots, K-1$. The interval boundaries satisfy the relationship:

$$M_{0,b}=M_{0,a}<M_{1,a}<\ldots<M_{K,a}=M_{1,b} \quad (6)$$

Whereas the decoding reconstruction is usually at the center of the interval:

$$r_b=(M_{0,b}+M_{1,b})/2, \quad (7)$$

$$\text{and } r_{k,a}=(M_{k,a}+M_{k+1,a})/2, k=0, \ldots, K-1. \quad (8)$$

The average distortion decrease and the average coding rate increase are calculated as:

$$\sum_{k=0}^{K-1} \int_{M_{k,a}}^{M_{k+1,a}} [(x-r_b)^2 - (x-r_{k,a})^2] p(x) dx, \quad (9)$$

and $$E[\Delta R_i] = \sum_{k=0}^{K-1} -P_k \log_2 P_k \text{ with } P_k = \int_{M_{k,a}}^{M_{k+1,a}} p(x) dx, \quad (10)$$

where p(x) is the a priori probability distribution of the coding symbol which is normalized so that the probability of the entire interval $(M_{0,b}, M_{1,b})$ is equal to 1:

$$\int_{M_{0,b}}^{M_{1,b}} p(x) dx = 1 \quad (11)$$

In the case the candidate bit $b_{n_i}$ undergoes significance identification, coefficient $w_i$ is insignificant within interval $(-2T_{n_i}, 2T_{n_i})$ before the coding of $b_{n_i}$, where $T_{n_i}=2^{-n_i}$ is the quantization step size determined by the coding layer $n_i$. After the coding of $b_{n_i}$, coefficient $w_i$ may be negatively significant with interval $(-2T_{n_i}, -T_{n_i}]$, positively significant with interval $[T_{n_i}, 2T_{n_i})$, or still insignificant with interval $(-T_{n_i}, T_{n_i})$. Thus there are three possible segments after significance identification with segment boundaries:

$$M_{0,b}=M_{0,a}=-2, T_{n_i}, M_{1,a}=-T_{n_i} M_{2,a}=T_{n_i}, \text{ and } M_{3,a}=M_{1,b}=2T_{n_i}, \quad (12)$$

The decoding reconstruction value before significance identification is:

$$r_b=0 \quad (13)$$

The decoding reconstruction values of each segment after significance identification are:

$$r_{0,a}=-1.5T_{n_i}, r_{1,a}=0, r_{2,a}=1.5T_{n_i}, \text{ respectively.} \quad (14)$$

Because the probability of significance $p_i$, i.e. the probability $b_{n_i}=1$ which is estimated by the QM-coder, can be formulated as:

$$p_i = \int_{-2T_{n_i}}^{-T_{n_i}} p(x) dx + \int_{T_{n_i}}^{2T_{n_i}} p(x) dx. \quad (15)$$

Assuming that the a priori probability distribution within the significance interval is uniform, (x) is formulated as:

$$p(x) = \frac{p_i}{2T_{n_i}}, \quad \text{for } T_{n_i} < |x| < 2T_{n_i} \quad (16)$$

By substituting equations (12), (13), (14) and (16) into (9) and (10), the average distortion decrease and average coding rate increase are calculated for significance identification as:

$$E[\Delta D_i] = p_i 2.25 T_{n_i}^2 \quad (17)$$

$$E[\Delta R_i] = (1 - p_i)[-\log_2(1 - p_i)] + 2\frac{p_i}{2}\left(-\log_2\frac{p_i}{2}\right) = p_i + H(p_i) \quad (18)$$

where H(p) is the entropy of a binary symbol with probability of 1 equal to p:

$$H(p) = -p \log_2 p - (1-p)\log_2(1-p) \quad (19)$$

Note that the average distortion (17) is not related to the a priori probability within insignificance interval $(-T_{n_i}, T_{n_i})$, because within that interval the decoding values before and after coding are both 0. The expected R-D slope for significant identification is derived from (17) and (18) as:

$$\lambda_{i,sig} = \frac{E[\Delta D_i]}{E[\Delta R_i]} = \frac{2.25 T_{n_i}^2}{1 + H(p_i)/p_i} = f_s(p_i) T_{n_i}^2 \quad (20)$$

Function $f_s(p)$ is the significance R-D slope modification factor defined as:

$$f_s(p) = \frac{2.25}{1 + \frac{H(p)}{p}}, \quad (21)$$

Figure 9:
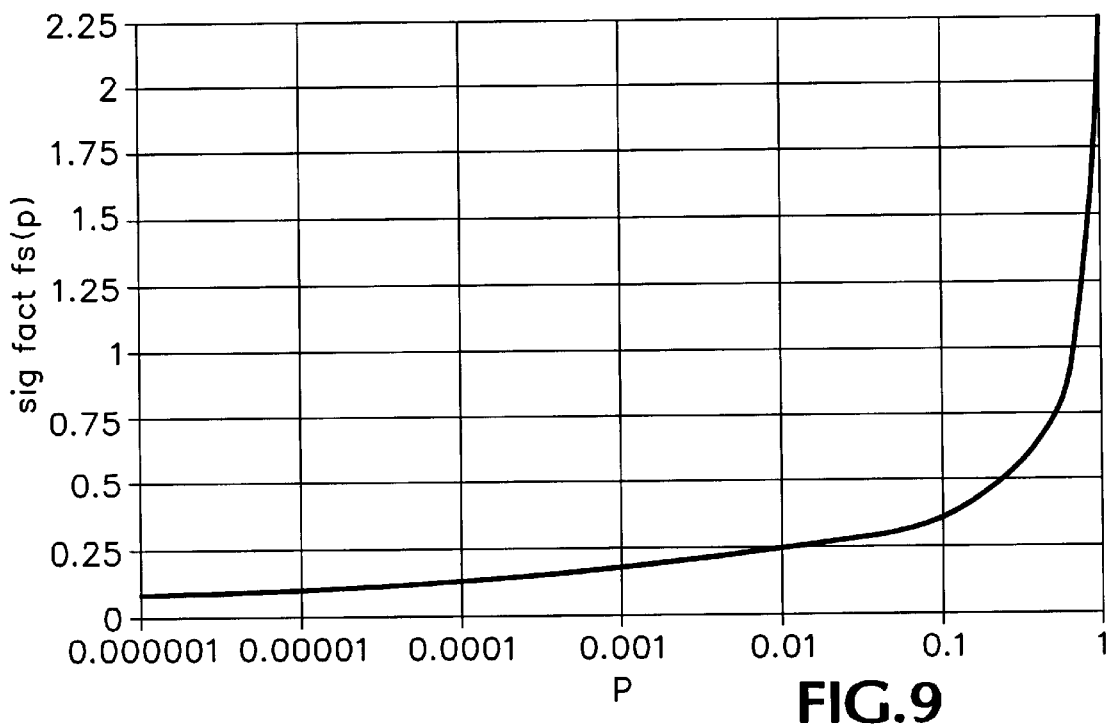
FIG. 9 is a graph showing a rate-distortion slope modification factor for significance identification.

FIG. 9 plots the R-D slope modification factor for significance identification. The symbol with higher probability of significance has a larger R-D slope and is thus favored to be coded first. The calculation of the R-D slope is only based on the coding layer $n_i$ and the probability of significance $p_i$, which is in turn estimated through the QM-coder state.

The expected R-D slope for refinement coding is similarly derived, where coefficient $w_i$ is refined from interval $[S_i, S_i+2T_{n_i}]$ to one of the two segments $[S_i, S_i+T_{n_i}]$ or $[S_i+T_{n_i}, S_i+2T_{n_i}]$. $T_{n_i}=2^{-n_i}$ is again the quantization step size determined by the coding layer $n_i$, and $S_i$ is the start of the refinement interval which is determined by the previously coded bits of coefficient $w_i$. The segment boundaries are:

$$M_{0,b}=M_{0,a}=S_i, M_{1,a}=S_i+T_{n_i}, \text{ and } M_{2,a}=M_{1,b}=S_i+2T_{n_i} \quad (22)$$

and the corresponding decoding reconstruction values are:

$$r_b=S_i+T_{n_i}, r_{0,a}=S_i+0.5T_{n_i}, \text{ and } r_{1,a}=S_i 1.5T_{n_i}. \quad (23)$$

Assuming that the a priori probability distribution within interval $[S_i, S_i+2T_{n_i}]$ is uniform, we have:

$$p(x) = \frac{1}{2T_{n_i}}, \quad \text{for } S_i < x < S_i + 2T_{n_i}, \quad (24)$$

The average distortion decrease and coding rate increase for refinement coding are calculated as:

$$E[\Delta D_i] = 0.25 T_{n_i}^2 \quad (25)$$

$$E[\Delta R_i] = 1 \quad (26)$$

The expected R-D slope for refinement coding is thus:

$$\lambda_{i,ref} = \frac{E[\Delta D_i]}{E[\Delta R_i]} = 0.25 T_{n_i}^2 \quad (27)$$

Comparing (20) and (27), it is apparent that for the same coding layer $n_i$, the R-D slope of refinement coding is smaller than that of significance identification whenever the significance probability $p_i$ is above 0.01. Thus in general the significance identification coding should be conducted before the refinement coding.

The a priori probability distribution of coefficient $w_i$ can also be modeled with a Laplacian distribution. In this case, the R-D slope for significance identification and refinement becomes:

$$\lambda_{i,sig} = f_s(p_i) g_{sig}(s, T_{n_i}) T_{n_i}^2 \quad (28)$$

$$\lambda_{i,ref} = 0.25 g_{ref}(s, T_{n_i}) T_{n_i}^2 \quad (29)$$

where σ is the variance of Laplacian distribution that can also be estimated from the already coded coefficients, $g_{sig}(\sigma, T)$ and $g_{ref}(\sigma, T)$ are Laplacian modification factors in the form:

$$g_{sig}(\sigma, T) = \frac{1}{2.25}\left(0.75 + \frac{3\sigma}{T} - \frac{3e^{-T/\sigma}}{1 - e^{-T/\sigma}}\right) \quad (30)$$

$$g_{ref}(\sigma, T) = 4\left(0.75 + \frac{2\frac{\sigma}{T}e^{-T/\sigma} - \frac{\sigma}{T}(1 + e^{-2T/\sigma})}{1 - e^{-2T/\sigma}}\right) \quad (31)$$

However, experiments show that the additional performance improvement provided by the Laplacian probability model is minor. Since the uniform probability model is much simpler to implement, it is used throughout the experiments described below.

Because the probability of significance Pi is discretely determined by the QM-coder state, and the quantization step size $T_{n_i}$ associated with the coding layer $n_i$ is also discrete, both the R-D slope of significance identification (20) and refinement (27) have a discrete number of states. For fast calculation, (20) and (27) are pre-computed and stored in a table indexed by the coding layer $n_i$ and the QM-coder state. Computation of the R-D slope is thus a lookup table operation. The R-D slope of refinement needs one entry per coding layer. The R-D slope of significance identification needs two entries per coding layer and per QM-coder state, as each QM-coder state may correspond to the probability of significance $p_i$ (if the most probable symbol is 1) or the probability of insignificance $1-p_i$ (if the most probable symbol is 0). Therefore, the total number of entries M in the lookup table is:

$$M = 2KL + K \quad (32)$$

where K is the maximum coding layer, L is the number of states in the QM-coder. In the current implementation, there are a total of 113 states in the QM-coder, and a maximum of 20 coding layers. This brings up a lookup table of size 4540 entries.

Coefficient Selection

The second RDE step performed by symbol selector 36 in FIG. 5 is selecting the coefficient with the maximum expected R-D slope. This may be done by exhaustive searching or sorting over all candidate bits, which is computationally expensive. An alternative implementation uses a threshold-based approach. The concept is to setup a series of decreasing R-D slope thresholds $\gamma_0 > \gamma_1 > \ldots > \gamma_n > \ldots$, and to scan the whole image repeatedly. The symbols with R-D slope between $\gamma_n$ and $\gamma_{n+1}$ are encoded at iteration n. The threshold based rate-distortion optimization sacrifices a little bit performance as symbols with R-D slope between $\gamma_n$ and $\gamma_{n+1}$ can not be distinguished. However, the coding speed is much faster as the search for the maximum R-D slope is avoided.

The entire coding operation of RDE is shown in FIG. 10. The left half of FIG. 10 shows the main RDE operation flow and the right half is a detailed description of R-D slope calculations and symbol coding. Since the symbols of significance identification and refinement are treated differently, they are depicted with separate branches in R-D slope calculation and symbol coding.

1) Initialization

The image is decomposed by a transform, such as the wavelet transform, in step 52. An initial R-D slope threshold $\gamma$ is set to $\gamma_0$ in block 54, with:

$$\gamma_0 = \frac{1}{16} T_0^2 \tag{33}$$

2) Scanning

The entire image is scanned in step 56 top-down from the coarsest scale to the finest scale. Scale is defined as resolution of the wavelet decomposition. Within each scale, subbands are coded sequentially with order LL, LH, HL and HH. The coder follows the raster line order within the subband.

3) Calculation of the Expected R-D Slope

The expected R-D slope is calculated for the candidate bit of each coefficient in blocks 66 and 68. Decision block 64 determines whether the coefficient is significant (whether a binary 1 has yet occurred in the string of coefficient bits). The expected R-D slope is calculated according to equation (20) in block 66 for the significance mode or equation (27) in block 68 for the refinement mode. The calculation of the R-D slope is typically a lookup table operation indexed by the QM-coder state and the coding layer $n_i$.

4) Coding Decision

The calculated R-D slope is compared with the current threshold $\gamma$ in decision block 70. If the R-D slope is smaller than $\gamma$ for the current iteration, the RDE coder processes the next coefficient by jumping back to decision block 64. Only the candidate bits with R-D slope greater than $\gamma$ are encoded.

5) Coding of the Candidate Bit

Depending again on whether the coefficient is already significant, the candidate bit is coded with significance identification in block 74 or with refinement in block 76. The QM-coder with context designated in FIG. 7 is used for significance identification coding in block 74. A fixed probability arithmetic coder is used to encode the sign and refinement in block 76. The sign bit is encoded right after the coefficient becomes significant. As mentioned above, the QM-coding and arithmetic coding are well known to those skilled in the art and are therefore not described in further detail.

6) Iteration

After the entire image has been scanned, the R-D slope threshold is reduced in block 66 by a factor of $\alpha$:

$$\gamma \leftarrow \frac{\gamma}{\alpha} \tag{34}$$

In the current implementation, $\alpha$ is set to 1.25. The RDE coder checks if the assigned coding rate is reached in decision block 62. For example, the RDE coder determines if the compressed image has reached a predetermined number of bits. If the coding rate is not reached, the RDE coder jumps back to block 56 and encoding repeated for the remaining unencoded bits at the new lower threshold value.

Experimental Results

Extensive experiments were performed to compare RDE with other existing algorithms. Test images were identified as Lena, Boats, Gold and Barbara. The image Lena is of size 512×512, all other images are of size 720×576. The test image is decomposed by a 5-level 9-7 tap biorthogonal Daubechies filter. It is then compressed by the layered zero coding LZC, proposed by Taubman and Zakhor, the set partitioning in hierarchical trees, as SPIHT proposed by Said and Pearlman, and the rate-distortion optimized embedding (RDE), respectively. The SPIHT coder is used as a reference coder. RDE essentially shuffles the bitstream of LZC and improves its embedding performance. Therefore RDE is compared with LZC to show the advantage of rate-distortion optimization. The initial probability of QM-coder in RDE is set at equilibrium, (i.e., the probabilities of 1 of all contexts are equal to 0.5). No pre-statistics of image is used. The compression ratio in the experiment is chosen to be 8:1 (1.0 bits per pixel (bpp)), 16:1 (0.5 bpp), 32:1 (0.25 bpp) and 64:1 (0.125 bpp). Since all three coders are embedded coders, the coding can be stopped at the exact bit rate.

Figure 11:
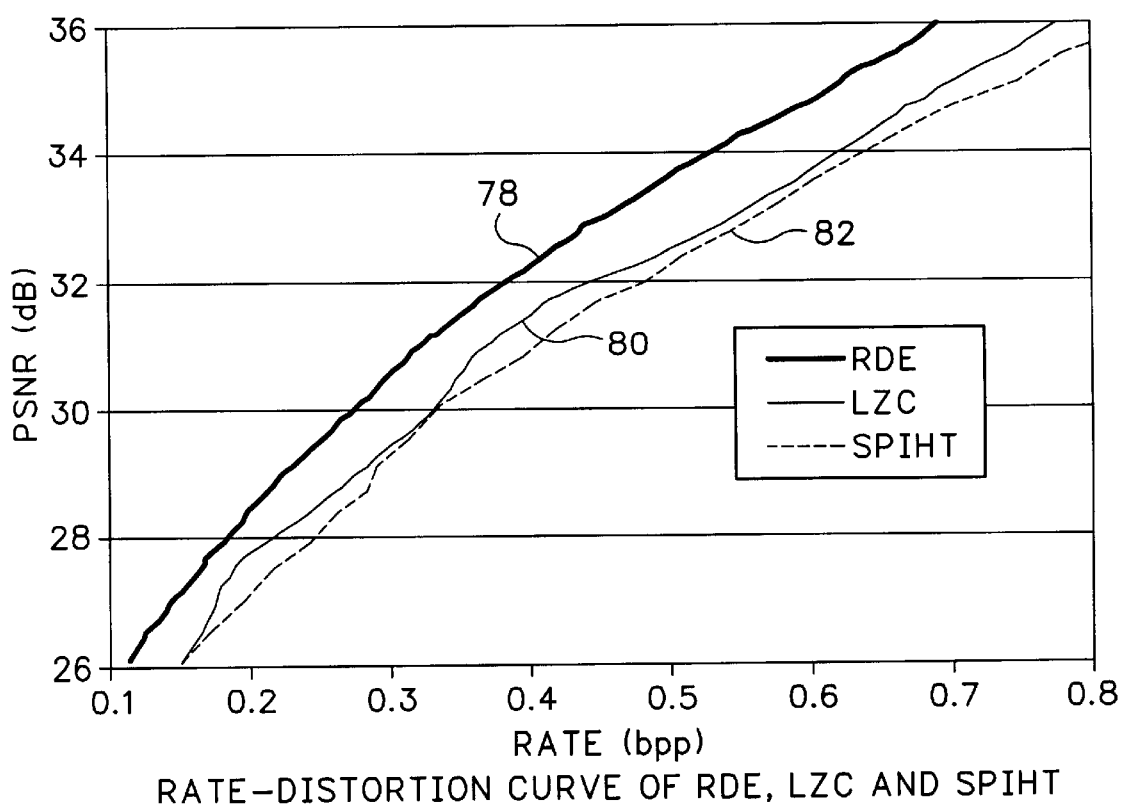
FIG. 11 is a graph comparing RDE rate-distortion with other encoding techniques.

The comparison results are shown in Table 2 of FIG. 13. The coding rate in bits per pixel is shown in column 2, the peak signal-to-noise ratio (PSNR) of LZC and SPIHT are shown in columns 3 and 4, and the PSNR of RDE and its gain over LZC and SPIHT are shown in column 5, 6 and 7, respectively. The R-D performance curve of the Barbara image is plotted in FIG. 11. The R-D curve of RDE is bold line 78, LZC is represented by solid line 80 and SPIHT is represented by dotted line 82. The R-D curve in FIG. 11 calculates one PSNR point every increment of a few bytes and indicates that RDE outperforms both LZC and SPIHT. The performance gain of RDE over LZC ranges from 0.1 to 0.8 dB, with an average of 0.3 dB. The gain shows the performance advantage of rate-distortion optimization. From FIG. 11, it can be observed that the R-D performance curve of RDE is also much smoother than that of LZC. The effect is a direct result of rate-distortion optimization. With the embedded bitstream organized by decreasing rate-distortion slope, the slope of the resultant performance curve decreases gradually, resulting in the smooth looking R-D curve of RDE. The performance gain of RDE over SPIHT ranges from −0.1 to 1.0 dB, with an average of 0.4 dB.

Thus, rate-distortion optimized embedded coder (RDE) improves the performance of embedded coding at every possible truncation point by coding first the symbol with the steepest R-D slope. That is, at each coding instance, RDE spends bits encoding the coding symbol with the largest distortion decrease per coding bit. For synchronisation between the encoder and the decoder, RDE uses the expected R-D slope, which can be calculated independently by both the encoder and the decoder. It also takes advantage of the probability estimation table of the QM-coder so that the calculation of the R-D slope can be performed using a lookup table operation.

Having described and illustrated the principles of the invention in a preferred embodiment thereof, it should be apparent that the invention can be modified in arrangement and detail without departing from such principles. I claim all modifications and variation coming within the spirit and scope of the following claims.

What is claimed is:

1. A rate-distortion optimization method for embedded coding of a digital image, comprising the steps of:

transforming the image to form a set of coefficients;

quantizing the coefficients to form a set of symbols;

calculating, for each symbol, a predicted rate-distortion slope based on an expected distortion decrease and an expected coding rate increase for that symbol;

selecting an encoding order for the symbols by ordering each symbol according to that symbol's calculated predicted rate-distortion slope, such that symbols with a steeper predicted rate distortion slope, and therefore larger predicted distortion decrease, are encoded before symbols with a less steep predicted rate distortion slope.

2. A rate-distortion optimization method for embedded coding of a digital image, comprising the steps of:

transforming the image to form a set of coefficients each comprising multiple bits;

analyzing a current layer, comprising the most significant unencoded bit from each coefficient, by calculating, for each bit in the current layer, a predicted rate-distortion slope based on an expected distortion decrease and an expected coding rate increase for that bit; and encoding a selected bit in the current layer with an entropy coder, the bit selected according to its calculated predicted rate distortion slope, such that bits from the current layer with a steeper predicted rate distortion slope, and therefore larger predicted distortion decrease, are encoded before bits with a less steep predicted rate distortion slope.

3. A method according to claim 2 wherein encoding a selected bit comprises encoding one bit in the current layer having a maximum predicted rate-distortion slope.

4. A method according to claim 2 including the following:

setting a threshold value;

encoding the bits in the current layer having a predicted rate-distortion slope greater than the threshold value;

reducing the threshold value; and reconfiguring the current layer of bits to include the most significant unencoded bits in each coefficient.

5. A method according to claim 2 wherein the predicted rate-distortion slope for a given bit is generated according to the coding layer of that bit, a significance status of that bit's coefficient indicating whether all previous bits in the coefficient are zeros, and the significance statuses of surrounding coefficients.

6. A method according to claim 2 wherein the predicted rate-distortion slope is derived for each bit according to a significance identification mode or a refinement mode.

7. A method according to claim 6 wherein the significance identification mode encodes all significant bits in the coefficients defined as all bits up to a first binary 1 value and the refinement mode encodes all refinement bits defined as all bits after the first binary 1 value.

8. A method according to claim 7 wherein the rate distortion slope is derived for the significant bits as follows:

$$\lambda_{i,sig} = \frac{E[\Delta D_i]}{E[\Delta R_i]} = \frac{2.25 T_{n_i}^2}{1 + H(p_i)/p_i} = f_s(p_i) T_{n_i}^2,$$

where the function $f_s(p)$ is the significance R-D slope modification factor defined as:

$$f_s(p) = \frac{2.25}{1 + \frac{H(p)}{p}},$$

$T_{n_i}$ is a quantization step size determined by the coding layer $n_i$, $p_i$ is probability of significance that a candidate bit $b_{n_i}=1$, and $H(p)$ is entropy of a binary symbol.

9. A method according to claim 7 wherein the rate distortion slope derived for the refinement bits is the following:

$$\lambda_{i,ref} = \frac{E[\Delta D_i]}{E[\Delta R_i]} = 0.25 T_{n_i}^2,$$

where $T_{n_i}$ is a quantization step size determined by the coding layer $n_i$.

10. A method according to claim 7 wherein the rate distortion slope for the significance bits and the refinement bits are derived according to a Laplacian probability distribution.

11. A method according to claim 6 wherein the significance identification mode uses a QM-coder that estimates a probability that the bit is significant according to a significant status of the same and adjacent coefficients.

12. A method according to claim 6 including precomputing and storing a table containing the rate-distortion slope values for significance bit coding and refinement bit coding and indexing the rate-distortion slope values according to the coding layer and a coder state corresponding the probability of significance or insignificance that the most probable bit during the significant identification mode is a 1 or a 0.

13. An embedded encoder for optimizing rate-distortion coding of a digitized image, comprising:

a transformer for encoding the digitized image, thereby forming a set of coefficients each comprising multiple bits;

a rate-distortion slope calculator for analyzing a set of candidate bits comprising a most significant unencoded bit from each coefficient, and determining, for each candidate bit, a predicted rate-distortion slope based on an expected distortion decrease and an expected coding rate increase for that bit; and a symbol selector for selecting an order for encoding the bits based on the predicted rate-distortion slope for each bit, such that bits with a steeper predicted rate distortion slope, and therefore larger predicted distortion decrease, are encoded before bits with a less steep predicted rate distortion slope.

14. A system according to claim 13 wherein the rate-distortion slope calculator operates in a significance identification mode when all previously coded bits in the coefficient are zero and a refinement mode after a first nonzero bit is identified in the coefficient during the significance identification mode.

15. A system according to claim 14 wherein the rate-distortion slope calculator comprises a lookup table including one refinement mode rate-distortion entry for each layer of coefficient bits and two significance identification mode rate-distortion entries, a first entry for a symbol 1 to be the most probable symbol, and a second entry for a symbol 0 to be the most probable symbol for each one of multiple QM-coder states each associated with a probability of significance.

16. A method for embedded coding a data array, comprising the steps of:

calculating a predicted rate distortion slope for each symbol in a group of symbols taken from the data array, the predicted rate distortion slope for a symbol based on an expected distortion decrease and an expected coding rate increase for that symbol; and selecting an encoding order for the symbols in the group by ordering each symbol according to that symbol's calculated predicted rate-distortion slope, such that symbols with a steeper predicted rate distortion slope, and therefore larger predicted distortion decrease, are encoded before symbols with a less steep predicted rate distortion slope.

17. The method of claim 16, wherein selecting an encoding order for the symbols in the group comprises the steps of:

setting a threshold value; and encoding the symbols in the group having predicted rate distortion slopes greater than the threshold value.

18. The method of claim 16, wherein selecting an encoding order for the symbols in the group comprises the steps of:

selecting the symbol from the group having the largest predicted rate distortion slope; and encoding that symbol.

19. An embedded digital image decoder comprising:

an entropy decoder for decoding an entropy-coded bitstream comprising embedded transform coefficient data;

a rate-distortion slope calculator for calculating a predicted rate-distortion slope for a transform coefficient location in a coefficient array, based on an expected distortion decrease and an expected coding rate increase for transmission of a bit corresponding to that coefficient location; and a bit encoding order decoder for determining the bit encoding order present in the decoded entropy-coded bitstream based on predicted rate-distortion slope calculated by the rate-distortion slope calculator.

20. The embedded digital image coder of claim 19, wherein for a bit present in the decoded entropy-coded bitstream, the bit encoding order decoder identifies the transform coefficient location having the largest predicted rate-distortion slope as the location in the coefficient array corresponding to that bit.

21. The embedded digital image decoder of claim 19, wherein the bit encoding order decoder examines the predicted rate-distortion slope for locations in the coefficient array in a predefined coefficient scan order, and determines a bit encoding order representing coefficient locations in that scan order having a predicted rate-distortion slope that exceed a slope threshold.

22. A method for decoding an embedded-coded image, the method comprising the steps of:

initializing a transform coefficient array;

decoding an encoded bitstream comprising embedded transform coefficient data; and determining the bit encoding order present in the decoded entropy-coded bitstream, by calculating a predicted rate-distortion slope for the most significant undecoded bit from each transform coefficient, and assigning data from the decoded entropy-coded bitstream to those coefficients in a descending order of predicted rate-distortion slope.

23. The method of claim 22, wherein the step of assigning data in a descending order of predicted rate-distortion slope comprises examining transform coefficients in a predefined coefficient scan order, and assigned data from the decoded entropy-coded bitstream to coefficients in that order that have a predicted rate-distortion slope exceeding a preset threshold.

24. The method of claim 22, wherein the step of assigning data in a descending order of predicted rate-distortion slope comprises identifying the transform coefficient location having the largest predicted rate-distortion slope as the next coefficient having a bit present in the bit encoding order.

25. The method of claim 22, wherein the step of calculating a predicted rate distortion slope comprises the steps of determining the coding layer of the bit, determining the significance status of the transform coefficient, and determining the significance statuses of surrounding coefficients.

26. The method of claim 25, wherein the step of calculating a predicted rate-distortion slope uses a QM-coder that estimates the probability that the bit is significant according to the significance status of the coefficient and adjacent coefficients.

27. The method of claim 26, wherein the step of calculating a predicted rate distortion slope comprises precomputing and storing a table containing rate distortion slope values, and indexing into this table using the coding layer of the bit, the significance status of the transform coefficient, and the significance statuses of surrounding coefficients.

* * * * *

UNITED STATES PATENT AND TRADEMARK OFFICE
CERTIFICATE OF CORRECTION

PATENT NO. : 6,625,321 B1
DATED : September 23, 2003
INVENTOR(S) : Li et al.

It is certified that error appears in the above-identified patent and that said Letters Patent is hereby corrected as shown below:

Title page,
Item [56], References Cited, OTHER PUBLICATIONS, "Bit Allocation for Dependent Quantization with Applications to Multiresolution and MPEG Video Coder, K. Ramchandran," should read -- Bit Allocation for Dependent Quantization with Applications to Multiresolution and MPEG Video Coders, K. Ramchandran, --.

Column 4,
Line 47, "in w'1 is" should read -- in w'i is --.
Line 64, "a ID-wavelet" should read -- a 1D-wavelet --.

Column 5,
Line 44, "coefficient W7. The" should read -- coefficient w7. The --.

Column 6,
Line 45, "bit b is" should read -- bit bni is --.

Column 8,
Line 40, "= -TniM2,a=" should read -- = -Tni, M2,a= --.
Line 62, "uniform, (x) is" should read -- uniform, p(x) is --.

Column 10,
Line 37, "significance Pi is" should read -- significance pi is --.

UNITED STATES PATENT AND TRADEMARK OFFICE
CERTIFICATE OF CORRECTION

PATENT NO. : 6,625,321 B1
DATED : September 23, 2003
INVENTOR(S) : Li et al.

It is certified that error appears in the above-identified patent and that said Letters Patent is hereby corrected as shown below:

Column 13,
Line 56, "statuses of surrounding" should read -- statuses of bits for surrounding --.

Column 14,
Line 17, "slope derived" should read -- slope is derived --.

Column 15,
Line 49, "image coder of claim" should read -- image decoder of claim --.

Signed and Sealed this

Sixth Day of July, 2004

JON W. DUDAS
*Acting Director of the United States Patent and Trademark Office*